US006958027B2

(12) United States Patent
Shimizu et al.

(10) Patent No.: US 6,958,027 B2
(45) Date of Patent: Oct. 25, 2005

(54) HYBRID TRANSMISSION

(75) Inventors: Hirofumi Shimizu, Kanagawa (JP); Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 68 days.

(21) Appl. No.: 10/686,581

(22) Filed: Oct. 17, 2003

(65) Prior Publication Data
US 2004/0097315 A1 May 20, 2004

(30) Foreign Application Priority Data
Nov. 14, 2002 (JP) ............................. 2002-330652
Nov. 14, 2002 (JP) ............................. 2002-330799

(51) Int. Cl.$^7$ ............................ F16H 3/72; B60K 1/00; H02K 47/04
(52) U.S. Cl. ............................. 475/5; 475/4; 180/65.2; 310/113; 290/4 R
(58) Field of Search ................. 475/4, 5, 10; 180/65.2; 310/112, 113; 290/4 C, 4 R, 4 A, 8

(56) References Cited

U.S. PATENT DOCUMENTS

| | | | |
|---|---|---|---|
| 5,424,593 A * | 6/1995 | Vaghani et al. ............... | 310/64 |
| 6,114,784 A * | 9/2000 | Nakano ........................ | 310/59 |
| 6,380,653 B1 * | 4/2002 | Seguchi ....................... | 310/112 |
| 6,472,788 B1 * | 10/2002 | Nakano ....................... | 310/114 |
| 6,639,337 B1 * | 10/2003 | Nakano ....................... | 310/113 |
| 2003/0064847 A1 * | 4/2003 | Oshidari et al. ............... | 475/5 |
| 2003/0069104 A1 * | 4/2003 | Nakano et al. ................ | 475/5 |
| 2003/0224892 A1 * | 12/2003 | Yamauchi et al. ............. | 475/5 |
| 2004/0097317 A1 | 5/2004 | Shimizu et al. | |

FOREIGN PATENT DOCUMENTS

| | | |
|---|---|---|
| JP | 2000-14081 A | 1/2000 |
| JP | 2000-203289 A | 7/2000 |

* cited by examiner

Primary Examiner—Tisha Lewis
(74) Attorney, Agent, or Firm—Foley & Lardner LLP

(57) ABSTRACT

A differential speed change unit is installed in a housing at a position near an engine and arranged coaxial with a common axis, and a two-rotor type motor/generator unit is installed in the housing at a position away from the engine and arranged coaxial with the common axis. The motor/generator unit has inner and outer rotors and a wiring. An inner rotor shaft is connected with the inner rotor to rotate therewith. The inner rotor shaft extends coaxially with the common axis to be operatively connected to the differential speed change unit. An outer rotor shaft is connected with the outer rotor to rotate therewith. The outer rotor shaft extends coaxially with the common axis to be operatively connected to the differential speed change unit. The housing has a split section at which the housing is dividable into two housing parts, and the split section is positioned between the differential speed change unit and the motor/generator unit.

9 Claims, 3 Drawing Sheets

HYBRID TRANSMISSION

BACKGROUND OF THE INVENTION

1. Field of the Invention

The present invention relates in general to hybrid transmissions for wheeled motor vehicles, and more particularly to the hybrid transmissions of a type that facilitates the work for assembling parts of a differential speed change unit in a housing of the transmission.

2. Description of the Related Art

One of the hybrid transmissions of the above-mentioned type is shown in Japanese Laid-Open Patent Application 2000-014081.

That is, the hybrid transmission of this publication comprises generally a differential speed change unit and a two-rotor type motor/generator unit which are coaxially arranged on a common axis and installed in a common housing. Upon mounting on a vehicle, the transmission is positioned beside an engine in such a manner that the speed change unit is placed between the motor/generator unit and the engine. The engine is operatively connected to given parts of the speed change unit from one axial end of the speed change unit and the motor/generator unit is operatively connected to given parts of the speed change unit from the other axial end of the speed change unit. That is, inner and outer rotors of the motor/generator unit, which are concentrically arranged on the common axis, are connected to the given parts of the speed change unit through inner rotor shaft and outer rotor shaft, respectively. The outer rotor shaft is actually in the shape of a cylindrical hollow structure and concentrically disposed about the inner rotor shaft. Furthermore, in the known transmission, a wiring of electromagnets of the motor/generator unit is led and exposed to the outside of the housing from an axial end of the housing that is away from the engine.

SUMMARY OF THE INVENTION

However, due to its inherent construction, the known hybrid transmission mentioned hereinabove tends to have the following shortcomings.

That is, in the known transmission, an output gear of the speed change unit is positioned nearer to the engine than essential parts of the speed change unit are and the output gear is rotatably supported by the housing through a bearing. This arrangement causes a split section of the housing to be positioned at a side of the engine than a side of the speed change unit with respect to the output gear. As is known, the split section is a section at which the housing is dividable into two housing parts. However, the arrangement of that split section inevitably brings about a difficulty in putting various parts of the speed change unit in a deeper given limited space of the housing under assembling process of the transmission.

Furthermore, in the above-mentioned known transmission, the arrangement of the wiring from the motor/generator unit causes an increase in axial length of the transmission. This is because the axial end of the housing, that is away form the engine, has to prepare a suitable structure through which the wiring is led to the outside of the transmission (or housing).

It is therefore an object of the present invention to provide a hybrid transmission which is free of the above-mentioned shortcomings.

According to a first aspect of the present invention, there is provided a hybrid transmission which comprises a housing having a common axis defined thereby, the housing being adapted to be positioned beside an engine when the hybrid transmission is mounted on a motor vehicle; a differential speed change unit installed in the housing at a position near the engine and arranged coaxial with the common axis; a two-rotor type motor/generator unit installed in the housing at a position away from the engine and arranged coaxial with the common axis, the motor/generator unit having inner and outer rotors and a wiring; an inner rotor shaft connected with the inner rotor to rotate therewith, the inner rotor shaft being coaxial with the common axis and extending to the differential speed change unit to be operatively connected to the same; and an outer rotor shaft connected with the outer rotor to rotate therewith, the outer rotor shaft being coaxial with the common axis and extending to the differential speed change unit to be operatively connected to the same, wherein the housing has a split section at which the housing is dividable into two housing parts, the split section being positioned between the differential speed change unit and the motor/generator unit.

According to a second aspect of the present invention, there is provided a hybrid transmission which comprises a housing having a common axis defined thereby, the housing being adapted to be positioned beside an engine when the hybrid transmission is mounted on a motor vehicle; a differential speed change unit installed in the housing at a position near the engine and arranged coaxial with the common axis; a two-rotor type motor/generator unit installed in the housing at a position away from the engine and arranged coaxial with the common axis, the motor/generator unit having inner and outer rotors and a wiring; an inner rotor shaft connected with the inner rotor to rotate therewith, the inner rotor shaft being hollow and coaxial with the common axis and extending to the differential speed change unit to be operatively connected to the same; and an outer rotor shaft rotatably received in the hollow inner rotor shaft and extending to the differential speed change unit to be operatively connected to the same, the outer rotor shaft being connected to the outer rotor through a connecting member that is positioned at one axial end of the motor/generator unit that is opposite to the other axial end that faces the differential speed change unit, wherein the housing has a split section at which the housing is dividable into two housing parts, the split section being positioned between the differential speed change unit and the motor/generator unit, and wherein the wiring of the motor/generator unit is exposed to a space between the motor/generator unit and the differential speed change unit and led and exposed to the outside of the housing through an opening formed in the housing near the split section.

According to a third aspect of the present invention, there is provided a hybrid transmission which comprises a housing having a common axis defined thereby and having a diametrically reduced portion, the housing being adapted to be positioned beside an engine when the hybrid transmission is mounted on a motor vehicle; a differential speed change unit installed in the housing at a position near the engine and arranged coaxial with the common axis; a two-rotor type motor/generator unit installed in the housing at a position away from the engine and arranged coaxial with the common axis, the motor/generator unit having inner and outer rotors and a wiring; an inner rotor shaft connected with the inner rotor to rotate therewith, the inner rotor shaft being hollow and coaxial with the common axis and extending to the differential speed change unit to be operatively connected to the same; and an outer rotor shaft rotatably received in the hollow inner rotor shaft and extending to the differential speed change unit to be operatively connected to the same, the outer rotor shaft being connected to the outer rotor through a connecting member that is positioned at one axial end of the motor/generator unit that is opposite to the other axial end that faces the differential speed change unit, wherein the housing has a split section at which the housing is dividable into two housing parts, the split section being positioned between the differential speed change unit and the motor/generator unit and near the diametrically reduced portion, and wherein the wiring of the motor/generator unit is exposed to a space between the motor/generator unit and the differential speed change unit and led and exposed to the outside of the housing through an opening formed in the diametrically reduced portion of the housing.

DETAILED DESCRIPTION OF THE INVENTION

In the following, a hybrid transmission of the present invention will be described in detail with the aid of the accompanying drawings.

For ease of description, various directional terms, such as, right, left, upper, lower, rightward and the like, are used in the description. However, such terms are to be understood with respect to a drawing or drawings on which the corresponding part or portion is shown.

Figure 1:
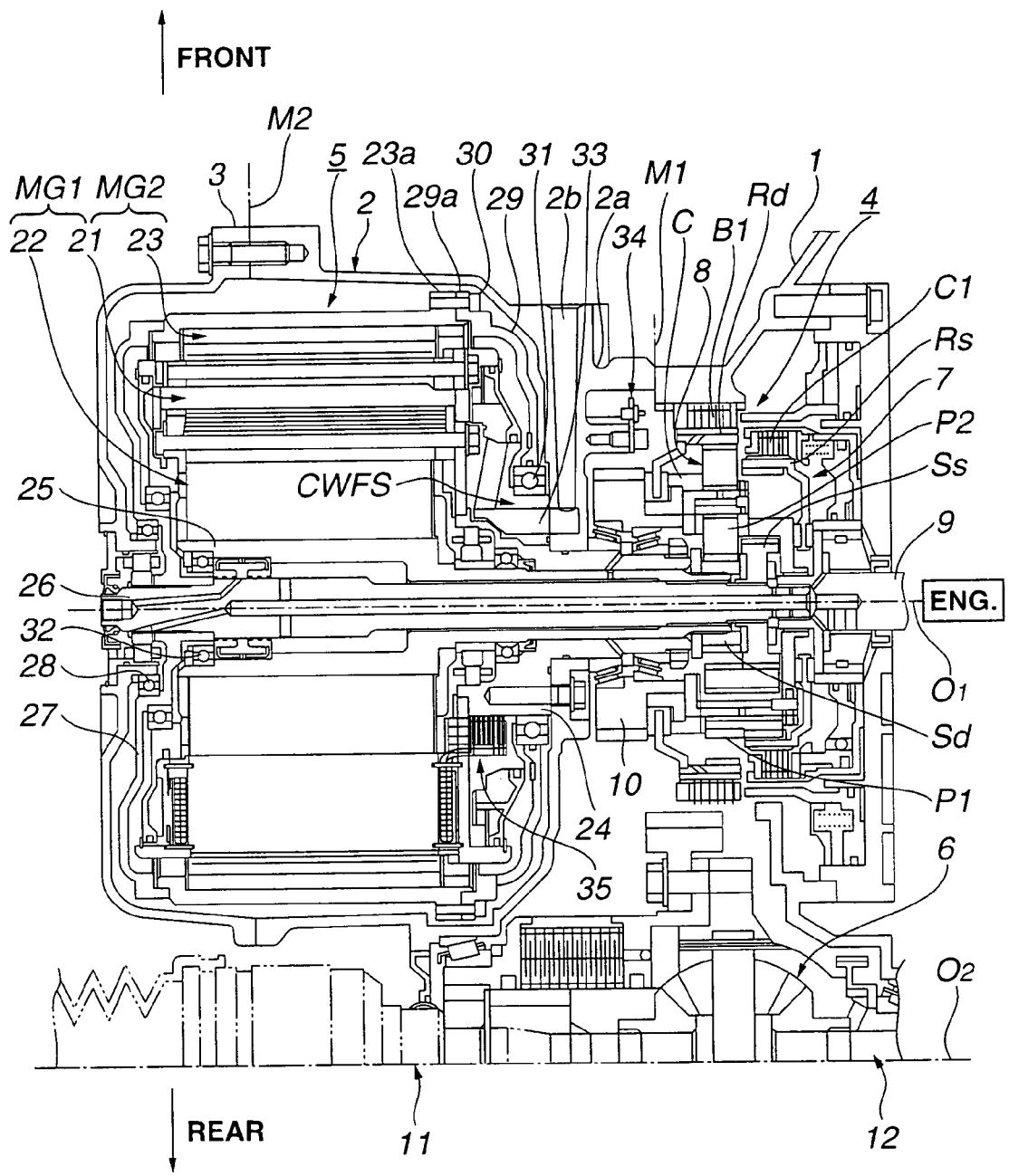
FIG. 1 is a sectional view of a hybrid transmission of the present invention, which is taken along a given plane.

Referring to FIG. 1, there is shown, but in a sectional manner, a hybrid transmission 100 according to the present invention.

Hybrid transmission 100 shown is an example that is used as a transaxle for a FF (viz., front engine front drive) type motor vehicle. Thus, in FIG. 1, a transversely mounted engine ENG is positioned at a right side of hybrid transmission 100. That is, in the drawing, an upper side indicates a front part of an associated motor vehicle, a lower side indicates a rear part of the vehicle, a left side indicates a left side of the vehicle and a right side indicates a right side of the vehicle.

As shown in FIG. 1, transmission 100 comprises a housing that includes a right housing part 1, a center housing part 2 and a left housing part 3 which are assembled together to constitute a single housing.

As shown, right and center housing parts 1 and 2 are coupled at a first split section M1, and center and left housing parts 2 and 3 are coupled at a second split section M2. The sprit section M1 or M2 is the part where respective facing edges of two housing parts (1 and 2) or (2 and 3) intimately contact each other.

Upon assembly on a vehicle, an engine (viz., internal combustion engine) ENG is placed on a right side of the transmission 100 in case of FIG. 1, as is described hereinabove.

In a right part of the transmission housing, that is, in a part defined by right and center housing parts 1 and 2, there is installed a differential speed change unit 4 which includes a ravigneawx type planetary gear set. While, in a left part of the transmission housing, that is, in a part defined by center and left housing parts 2 and 3, there is installed a two-rotor type motor/generator unit 5. The unit 5 is, for example, a combined current double layer winding motor.

Differential speed change unit 4 and motor/generator unit 5 are coaxially arranged on a common axis $O_1$ of the transmission housing. Beside the axis $O_1$, a countershaft (not shown) is arranged which is installed in the housing and extends in parallel with the axis $O_1$. Furthermore, beside the axis $O_1$, another axis $O_2$ extends in parallel with the axis $O_1$, about which a differential gear unit 6 is arranged.

Differential speed change unit 4 generally comprises first and second planetary gear units 7 and 8 which use long pinions P1 in common. First planetary gear unit 7 generally comprises a sun gear Ss, a ring gear Rs and long pinions P1 which are meshed with both sun gear Ss and ring gear Rs. Second planetary gear unit 8 generally comprises a sun gear Sd, a ring gear Rd, long pinions P1 and larger diameter short pinions P2. Short pinions P2 are meshed with both sun gear Sd and ring gear Rd and meshed with long pinions P1.

In differential speed change unit 4, ring gear Rd, short pinions P2, long pinions P1 and sun gear Ss constitute a so-called double pinion planetary gear unit, and all of short and long pinions P2 and P2 are rotatably carried by a common pinion carrier C.

Differential speed change unit 4 having the above-mentioned ravigneawx type planetary gear set installed therein uses four major rotation members (viz., sun gear Ss, sun gear Sd, ring gear Rs and pinion carrier C) as main elements for providing a two-freedom type differential speed change unit in which when determining the rotation speed of two of the four rotation members, the rotation speed of the other two rotation members is automatically determined.

Around ring gear Rs, there is arranged a clutch C1 through which a rotation of an input shaft 9 is inputted to ring gear Rs. Input shaft 9 is powered by engine ENG. Pinion carrier C is connected via spline connection to an output gear 10 that is arranged between differential speed change unit 4 and motor/generator unit 5.

Between output gear 10 and differential gear unit 6, there are arranged gears that are disposed on the above-mentioned countershaft (not shown), through which a torque of output gear 10 is transmitted to differential gear unit 6 and then to drive shafts 11 and 12 of steered front left and right drive road wheels (not shown).

Motor/generator unit 5 generally comprises an annular stator 21 that has electromagnets mounted thereon, an inner rotor 22 that has permanent magnets embedded therein and is concentrically and rotatably arranged in annular stator 21 and an outer rotor 23 that has permanent magnets embedded therein and is concentrically and rotatably arranged around annular stator 21. Thus, inner rotor 22, annular stator 21 and outer rotor 23 constitute a so-called triple layered cylindrical structure. Motor/generator unit 5 having the above-mentioned structure is installed in the space defined by both center housing part 2 and left housing part 3, as has been mentioned hereinabove.

As is seen from FIG. 1, annular stator 21 and inner rotor 22 constitute a first motor/generator unit section MG1, and annular stator 21 and outer rotor 23 constitute a second motor/generator unit section MG2. Thus, first motor/generator unit section MG1 is arranged in an inner side of second motor/generator unit section MG2.

Each of unit sections MG1 and MG2 has two functions, one being a motor function wherein when fed with a combined current, it outputs rotation of rotor 22 or 23 with a rotation speed and a rotation direction which are both determined by the characteristic of the current, and the other being a generator function wherein when applied with a power through rotor 22 or 23, it generates an electric power of which characteristic is determined by rotation speed of rotor 22 or 23.

For mounting motor/generator unit 5 into the given space defined by center and left housing parts 2 and 3, the following measures are employed in the invention.

As is seen from FIG. 1, a bearing holder 24 is fixed by bolts to a wall portion of center housing part 2. Axially right end of annular stator 21 is fixed to bearing holder 24, so that annular stator 21 is tightly held by the transmission housing. A hollow inner rotor shaft 25 is tightly disposed, at its rear enlarged part, in inner rotor 22, and a front slim part of the shaft 25 is passed through a center opening of bearing holder 24 and projected forward or rightward to right housing part 1 to be operatively connected or engaged with sun gear Sd.

In hollow inner rotor shaft 25, there is inserted an outer rotor shaft 26 that is rotatable relative to inner rotor shaft 25. Outer rotor shaft 26 has a right slim part projected forward from an front open end of inner rotor shaft 25 to be operatively connected or engaged with the other sun gear Ss.

To a left end of outer rotor 23, there is connected a circular drive plate 27. A center opening of drive plate 27 is connected to a left end of outer rotor shaft 26 through a serration connection, so that outer rotor 23 is connected to outer rotor shaft 26 to rotate together. A radially inner part of drive plate 27 is rotatably supported by left housing part 3 through a bearing 28, so that drive plate 27 serves as a supporter for the left part of outer rotor 23.

While, to a right end of outer rotor 23, there is connected a circular end plate 29. For this connection, a peripheral flange 29a of end plate 29 and a peripheral flange 23a of outer rotor 23 are put together and tightly connected by bolts 30. With this, end plate 29 is tightly connected to the right end of outer rotor 23 to rotate together. A radially inner part of end plate 29 is rotatably supported by bearing holder 24 of center housing part 2 through a bearing 31, so that end plate 29 serves as a supporter for the right end of outer rotor 23.

Between the radially inner part of drive plate 27 and the left end portion of inner rotor shaft 25, there is operatively interposed a bearing 32, so that the left end of inner rotor 22 is rotatably supported by left housing part 3 through inner rotor shaft 25.

A cooling water flow structure CWFS for cooling annular stator 21 comprises cooling water passages 2b formed in the wall portion of center housing part 2 and a cooling water passage 33 formed in bearing holder 24.

It is to be noted that the cooling water flow structure CWFS and a wiring 34 of the electromagnets of annular stator 21 are each arranged at a position between differential speed change unit 4 and motor/generator unit 5. With this arrangement, an axial length of the transmission housing (1+2+3) can be reduced because the axial left end of the housing has no need of preparing a structure through which wiring 34 is exposed to the outside of the housing. In the transmission of the above-mentioned Japanese Laid-Open Patent Application 2000-014081, such structure is provided on the axial left end of the transmission housing. Thus, in the present invention, steered front left and right drive road wheels incorporated with drive shafts 11 and 12 can have a larger steerage angle due to the compact construction of the transmission housing.

Figure 2:
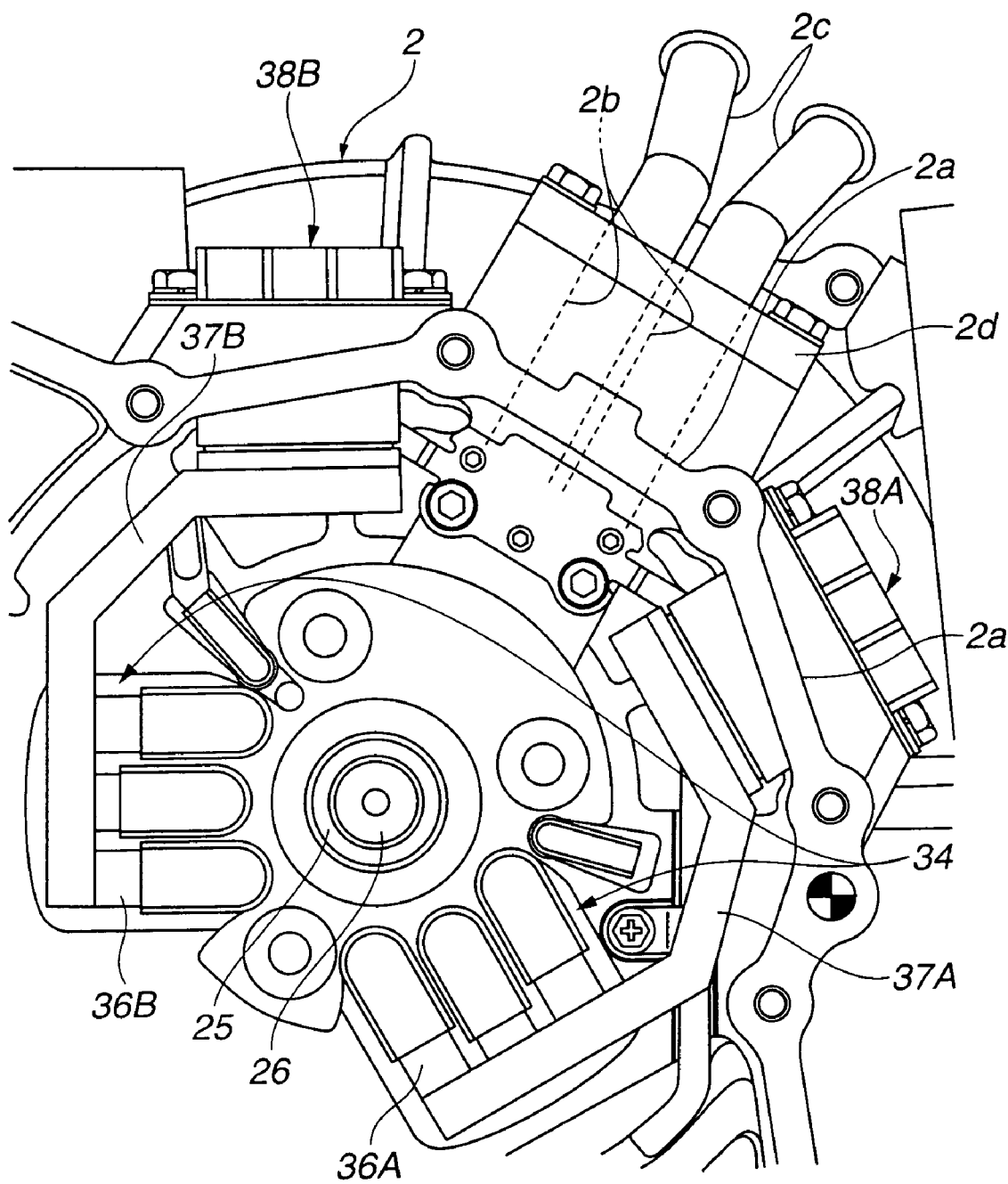
FIG. 2 is an enlarged inner view of a center housing part of the hybrid transmission of the present invention with an output gear removed, which is viewed from first split section M1.
Figure 3:
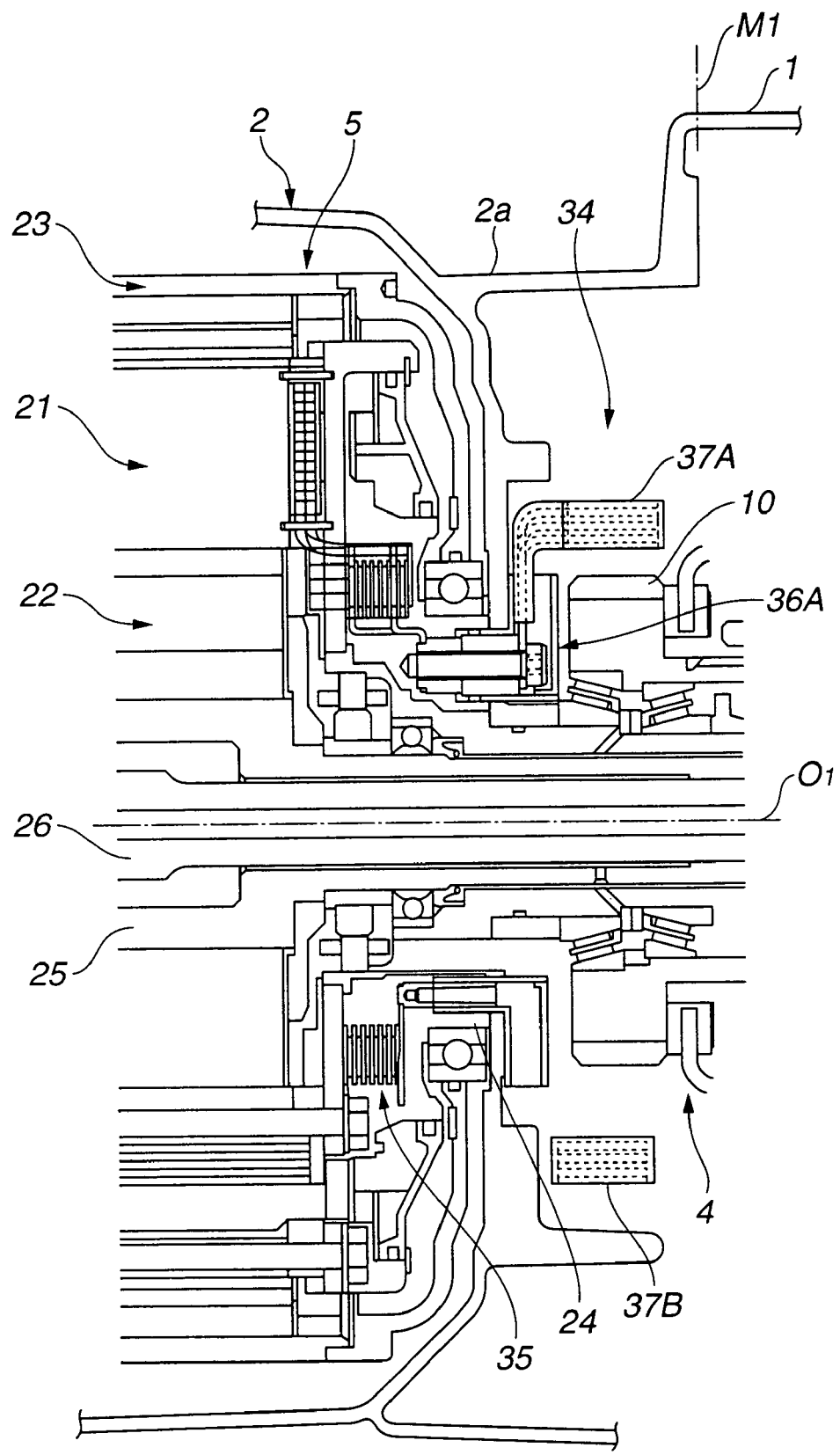
FIG. 3 is an enlarged sectional view of an essential part of the hybrid transmission of the present invention, which is taken along a plane that is different from that of FIG. 1.

The arrangement of various parts of the hybrid transmission 100 of the present invention will be more clearly understood from the following description that is made with the aid of FIGS. 2 and 3 in addition to FIG. 1.

FIG. 2 is a view of an inner portion of center housing part 2 taken from the position of the first split section M1 with output gear 10 removed. FIG. 3 is an enlarged sectional view of an essential portion of the hybrid transmission of the present invention, taken along a plane that is different from that of FIG. 1.

As is seen from FIGS. 1 and 2, the first split section M1 is positioned substantially between motor/generator unit 5 and differential speed change unit 4, the above-mentioned cooling water flow structure CWFS and wiring 34 are positioned also between motor/generator unit 5 and differential speed change unit 4, and these cooling water flow structure CWFS and wiring 34 are held by center housing part 2.

As is understood from the drawings, particularly FIGS. 1 and 2, wiring 34 of the electromagnets of annular stator 21 is led and exposed to the outside of the transmission housing from a diametrically reduced portion 2a of center housing part 2.

As is seen from FIG. 3, wiring 34 comprises an annular inner feeding unit 35 that is positioned near a right end of a center bore defined by annular stator 21. The unit 35 shown in the drawing is arranged concentric with common axis $O_1$. The unit 35 comprises a plurality of annular bus bars that are put on one another through respective insulators. The bus bars are connected to coils of the electromagnets of stator 21 through lead wires.

As is seen from FIG. 2, the wiring 34 further comprises two groups of power feeding units each including inner connectors 36A or 36B, an outer feeding cable 37A or 37B and an outer connector unit 38A or 38B which are connected in such a manner as will be described hereinnext.

Inner connectors 36A or 36B are mounted on bearing holder 24 and connected to the bus bars of the above-mentioned annular inner feeding unit 35 through respective wires. Outer feeding cable 37A or 37B comprises a plurality of flat bus bars that are put on one another through respective insulators. Inner connectors 36A or 36B are respectively connected to left ends of the bus bars of outer feeding cable 37A or 37B. Right ends of the bus bars of outer feeding cable 37A or 37B are connected to respective terminal ends of outer connector unit 38A or 38B. Each outer connector unit 38A or 38B is fixed to an aperture formed in a diametrically reduced portion 2a of center housing part 2. Thus, when predetermined two external plug units (not shown) are put into respective socket portions of outer connector units 38A and 38B from outside of transmission housing, electric connection between the coils of the stator 21 and an electric power source (not shown) becomes established.

As is seen from 2, cooling water passages 2b of the wall portion of center housing part 2 are led to respective outer tubes 2c that are connected to the diametrically reduced portion 2a of center housing part 2 by means of a connector 2d.

In the following, advantages of the present invention will be described.

As is described hereinabove, in the present invention, the first split section M1 at which the housing is dividable into right housing part 1 and center housing part 2 is positioned between motor/generator unit 5 and differential speed change unit 4. Accordingly, in assembling process of the hybrid transmission 100 keeping right and center housing parts 1 and 2 uncoupled, the work for putting various parts of the units 4 and 5 into their given positions in right and center housing parts 1 and 2 is readily carried out.

Furthermore, in the present invention, as is described hereinabove, outer rotor shaft 26 is arranged to pass through hollow inner rotor shaft 25, and outer rotor 23 is connected to outer rotor shaft 26 by circular drive plate 27 which is positioned at one axial end of motor/generator unit 5 that is opposite to the other axial end that faces differential speed change unit 4, and wiring 34 of electromagnets of annular stator 21 is led to a right side of motor/generator unit 5 in FIG. 1 and led to the outside of the transmission housing from diametrically reduced portion 2a of center housing part 2 that is near the first split section M1. Thus, an axial length of the hybrid transmission 100 can be reduced because the housing has no need of preparing any structure at its axial end through which wiring is led to the outside of the transmission housing. Furthermore, due to the close positioning between wiring 34 and first split section M1, the work for arranging and assembling wiring 34 in second housing part 2 is easily carried out. Furthermore, due to employment of the two groups of power feeding units, reduction in electric resistance of wiring 34 is expected.

Furthermore, due to provision of the diametrically reduced portion of center housing part 2, an annular electric pump (not shown) which is to be disposed around center housing part 2 for pumping cooling water can be reduced in diameter, which promotes compactness of the hybrid transmission 100 of the invention. Operation of such electric pump is needed under a condition wherein motor/generator unit 5 is operated while the engine is at rest.

Since cooling water passages 2b defined by the wall portion of center housing part 2 terminate near the diametrically reduced portion 2a, the length of passages 2b can be reduced, which brings about a reduction in water flow resistance.

The entire contents of Japanese Patent Applications 2002-330652 (filed Nov. 14, 2002) and 2000-330799 (filed Nov. 14, 2002) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A hybrid transmission comprising:
a housing having a common axis defined thereby, the housing being adapted to be positioned beside an engine when the hybrid transmission is mounted on a motor vehicle;
a differential speed change unit installed in the housing at a position near the engine and arranged coaxial with the common axis;
a two-rotor type motor/generator unit installed in the housing at a position away from the engine and arranged coaxial with the common axis, the motor/generator unit having inner and outer rotors and a wiring;
an inner rotor shaft connected with the inner rotor to rotate therewith, the inner rotor shaft being coaxial with the common axis and extending to the differential speed change unit to be operatively connected to the same; and
an outer rotor shaft connected with the outer rotor to rotate therewith, the outer rotor shaft being coaxial with the common axis and extending to the differential speed change unit to be operatively connected to the same;
wherein the housing has a split section at which the housing is dividable into two housing parts, the split section being positioned between the differential speed change unit and the motor/generator unit;
wherein the outer rotor shaft is concentrically received in the inner rotor shaft which is hollow, wherein the outer rotor is connected to the outer rotor shaft through a connecting member that is positioned at one axial end of the motor/generator unit that is opposite to the other axial end that faces the differential speed change unit, and wherein the wiring of the motor/generator unit is exposed to a space between the motor/generator unit and the differential speed change unit and led and exposed to the outside of the housing through an opening formed in the housing near the split section.

2. A hybrid transmission as claimed in claim 1, in which the connecting member is a circular drive plate, the circular drive plate having a peripheral portion which is secured to the outer rotor and a center opening which is connected to the outer rotor shaft by a serration connection.

3. A hybrid transmission as claimed in claim 1, in which the opening of the housing through which the wiring is exposed to the outside is provided in a diametrically reduced portion of the housing.

4. A hybrid transmission as claimed in claim 1, in which the wiring comprises:
an annular inner feeding unit concentrically and stably mounted in the motor/generator unit, the annular inner feeding unit having mutually insulated bus bars which are connected to coils of electromagnets of a stator of the motor/generator unit;
inner connectors fixed to the housing and connected to the bus bars of the annular inner feeding unit respectively;
an outer feeding cable having mutually insulated bus bars connected to the inner connectors respectively; and
an outer connector unit connected to the opening of the housing, the outer connector unit having a plurality of terminal ends to which the mutually insulated bus bars of the outer feeding cable are connected respectively.

5. A hybrid transmission as claimed in claim 4, further comprising cooling water passages which are formed in a wall portion of the housing to let a cooling water flow therethrough for cooling the stator of the motor/generator unit.

6. A hybrid transmission as claimed in claim 5, in which the wall portion of the housing is provided with a bearing holder which has a center opening through which the inner and outer rotor shafts pass, and in which the stator of the motor/generator unit is fixed.

7. A hybrid transmission as claimed in claim 6, in which the bearing holder has a cooling water passage that is merged with the cooling water passages of the wall portion of the housing.

8. A hybrid transmission comprising:
a housing having a common axis defined thereby, the housing being adapted to be positioned beside an engine when the hybrid transmission is mounted on a motor vehicle;
a differential speed change unit installed in the housing at a position near the engine and arranged coaxial with the common axis;
a two-rotor type motor/generator unit installed in the housing at a position away from the engine and arranged coaxial with the common axis, the motor/generator unit having inner and outer rotors and a wiring;
an inner rotor shaft connected with the inner rotor to rotate therewith, the inner rotor shaft being hollow and coaxial with the common axis and extending to the differential speed change unit to be operatively connected to the same; and an outer rotor shaft rotatably received in the hollow inner rotor shaft and extending to the differential speed change unit to be operatively connected to the same, the outer rotor shaft being connected to the outer rotor through a connecting member that is positioned at one axial end of the motor/generator unit that is opposite to the other axial end that faces the differential speed change unit, wherein the housing has a split section at which the housing is dividable into two housing parts, the split section being positioned between the differential speed change unit and the motor/generator unit, and wherein the wiring of the motor/generator unit is exposed to a space between the motor/generator unit and the differential speed change unit and led and exposed to the outside of the housing through an opening formed in the housing near the split section.

9. A hybrid transmission comprising:

a housing having a common axis defined thereby and having a diametrically reduced portion, the housing being adapted to be positioned beside an engine when the hybrid transmission is mounted on a motor vehicle;

a differential speed change unit installed in the housing at a position near the engine and arranged coaxial with the common axis;

a two-rotor type motor/generator unit installed in the housing at a position away from the engine and arranged coaxial with the common axis, the motor/generator unit having inner and outer rotors and a wiring;

an inner rotor shaft connected with the inner rotor to rotate therewith, the inner rotor shaft being hollow and coaxial with the common axis and extending to the differential speed change unit to be operatively connected to the same; and an outer rotor shaft rotatably received in the hollow inner rotor shaft and extending to the differential speed change unit to be operatively connected to the same, the outer rotor shaft being connected to the outer rotor through a connecting member that is positioned at one axial end of the motor/generator unit that is opposite to the other axial end that faces the differential speed change unit, wherein the housing has a split section at which the housing is dividable into two housing parts, the split section being positioned between the differential speed change unit and the motor/generator unit and near the diametrically reduced portion, and wherein the wiring of the motor/generator unit is exposed to a space between the motor/generator unit and the differential speed change unit and led and exposed to the outside of the housing through an opening formed in the diametrically reduced portion of the housing.

* * * * *